INVENTORS.
M. K. TESTERMAN
P. C. MC LEOD
BY Hudson & Young
ATTORNEYS

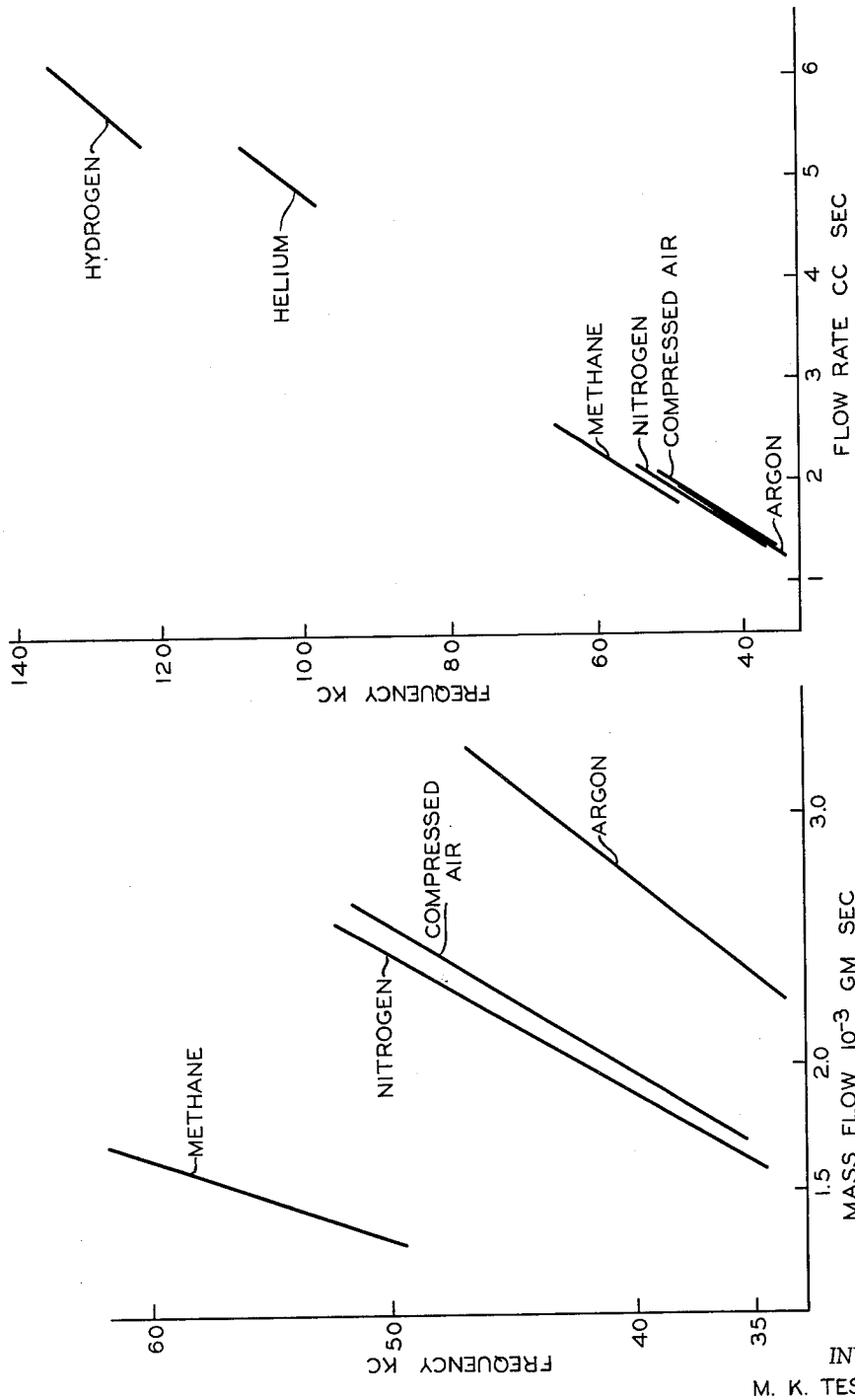

3,144,767
METHOD AND APPARATUS FOR DETERMINING FLUID FLOW RATE
Maurice K. Testerman and Paul C. McLeod, Little Rock, Ark., assignors to Phillips Petroleum Company, a corporation of Delaware
Filed July 3, 1961, Ser. No. 121,531
11 Claims. (Cl. 73—194)

This invention relates to utilizing an ultrasonic frequency wave generator as a fluid volumetric flowmeter. In another aspect it relates to using said generator as a mass flowmeter for a fluid of constant or known composition.

While there are a number of known instruments for measuring fluid flow rates, involving the generation of audible sound waves, these are characterized by sluggishness to changes in flow rates, which mean long time constants. Moreover, audible waves have, by definition, relatively long wave lengths, which require the proportionately larger gas volumes to permit detection of changing flow rates.

Even the prior art devices which depend upon ultrasonic vibrations suffer from serious limitations insofar as producing a wave that can actuate electrical pick-up equipment, lacking a desired low time constant and linear relationship between flow rate and output frequency.

Accordingly, it is an object of this invention to provide an ultrasonic frequency wave generator which serves as a flowmeter.

Another object is to provide an ultrasonic frequency wave generator whose output frequency is linearly related to the volumetric flow rate of a gas passing therethrough which gas provides the energy for operating the generator.

It is another object to provide a flowmeter which has good flow sensitivity to changes in flow rates in the range of a few microliters per second.

Still another object is to provide a volumetric flowmeter which has a low time constant characterized by the restoration of a disturbance of equilibrium in a few milliseconds.

Yet another object is to provide an ultrasonic wave generator that produces a frequency signal of sufficient amplitude to actuate an electrical pick-up means.

Another object of this invention is to provide a method for determining fluid flow rate.

Other objects, advantages and features of our invention will be apparent to those skilled in the art without departing from the spirit and scope of this invention.

We have devised an ultrasonic frequency wave generating device, which operates on the principle of the conservation of energy in flowing jets. When the flow of a jet stream is interrupted near the orifice, the feedback from the interrupting element opposes the jet stream and has a tendency to lift the jet as a whole above the obstruction. The feedback will be pulsating and, consequently, the intersection of the jet stream and the feedback stream will oscillate between the orifice and the obstruction increasing amplitude of the natural frequency. Stated in other terms, the angle of deflection of the jet stream changes in magnitude between a maximum and minimum value, resulting in undulating pressure over the flowing jet. Thus it will be seen, our oscillations are produced by a molecular-mechanical type of feedback.

By placing a cavity below, and preferably perpendicular to the flowing jet for maximum flow sensitivity, an amplitude reinforcement is obtained of the undulations in the jet by varying the cavity length to a point where the system is caused to oscillate. The edge of the cavity opposite the orifice serves as a means of perturbation of the flowing jet stream. Operating in this manner the device generates sufficient power to activate a condenser microphone, located directly above the flowing jet stream. A viscosity effect enters into this action which is a function of the composition of the generating gas. Therefore the generator must be calibrated with the gas composition to be utilized in order that the linear volumetric flow rate versus frequency relationship holds. The above is based on the assumptions that: a typical pressure in the range 2 to 10 p.s.i. is maintained on the gas input; a straightening vane leads to the orifice; the orifice width is comparable to the cavity diameter; and the orifice horizontal dimension is greater than its vertical dimension by a factor ranging from 5 to 20. By appropriate orifice design, scaling-up the size of the generator so as to operate at greater flow rates, and pressures ranging from ¼ to 500 p.s.i. can be achieved.

The instant meter has a number of advantages including simple construction, good sensitivity to small changes in volumetric flow rate, linear response to all gases of constant composition, and the low time constant desired in precision, flow rate measurement.

In one embodiment, my invention comprises a single ultrasonic wave generator device located in a rigid, gastight chamber, and so disposed so as to permit the passage therethrough of a true gas. This chamber can then be readily purged to 100 percent concentration of the gas to be measured, so that for a given flow rate, a very stable frequency output is quickly achieved by the enclosed generator.

The resulting ultrasonic frequency wave is first converted to an electrical signal by a pick-up device, such as a condenser microphone, which signal has a frequency corresponding to the frequency of the ultrasonic wave, and, in turn, to the given volumetric flow rate of the flowing gas.

Next, the electrical signal from the pick-up is passed into an amplification means and from thence is fed into a Schmitt Trigger, which supplies the digital output to a standard counter, and/or the Trigger feeds the signal to a digital-to-analog converter; the latter, in turn, supplies an analog output to a conventional recorder. In either manner the amplified signal represents the instantaneous flow rate of the gas being measured.

Other objects, advantages and features of our invention will be apparent from a study of the accompanying disclosure, appended claims and drawing, in which:

FIGURE 4 is a graphic illustration of the relation between generator frequency output and volumetric flow rate for several common gases; and FIGURE 5 is another graphic illustration of the relation between generator frequency output and mass flow rate for several gases.

Figure 1:
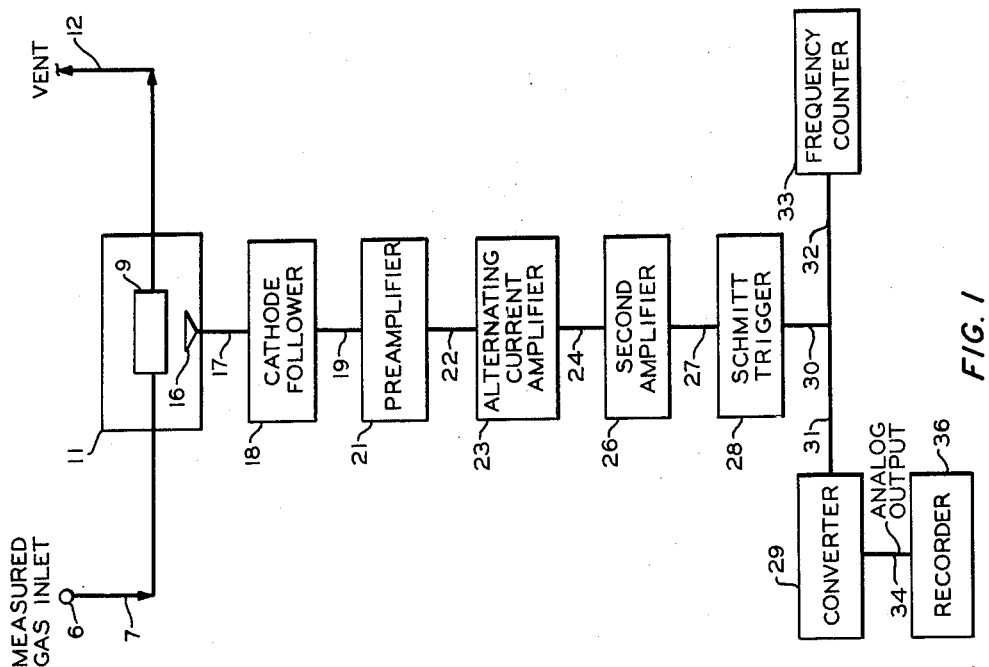
FIGURE 1 is a schematic diagram of the gas flowmeter of this invention and the accompanying electrical components.

Referring now to the drawing, and FIGURE 1, in particular, there is shown a gas inlet 6, passing through conduit 7. Conduit 7 feeds the gas to be measured to the inlet end of generator 9, which is disposed in a sealed, rigid chamber 11. The effluent from generator 9 exhausts via conduit 12. A wave pick-up means, specifically microphone 16, is located adjacent the jet stream of generator 9, and within chamber 11. Microphone 16 converts the pressure vibrations in the column of gas above the jet stream to a corresponding electrical signal. A Zenith 98S–24916 capacitor-type microphone is suitable for this energy conversion step.

Figure 2:
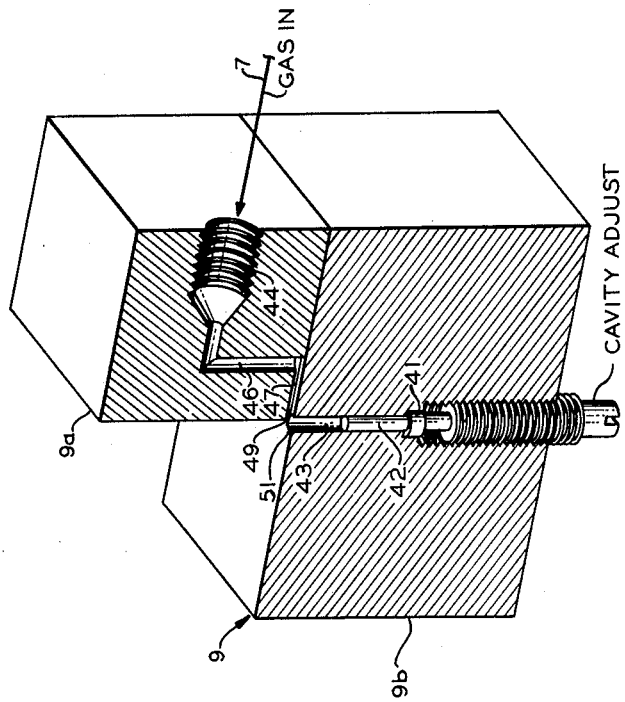
FIGURE 2 is a perspective view in partial section of the ultrasonic frequency wave generator of this invention.

Referring to FIGURE 1 and FIGURE 2, electrical lead 17 connects pick-up 16 and capacitor 61, which couples the pick-up signal to the control grid of a cathode follower 18, the vacuum tube being designated 62. Cathode follower 18 is coupled to a preamplifier 21 via lead 19 and capacitor 64. The resulting signal from pentode 66 passes via lead 22 and capacitor 68, to a main, alternating current amplifier 23, and thence via lead 24 to a second amplifier 26, for a total gain of about 1600. The amplified signal passes via lead 27 to a Schmitt Trigger 28, which is designed to suppress electrical noise and present constant amplitude impulses to the digital-to-analog converter 29 via leads 30 and 31. Concurrently, the digital output passes from Trigger 28 via leads 30 and 32 to a frequency counter 33. The analog output from converter 29 passes via lead 34 to a recorder 36.

In FIGURE 2 is shown a perspective view, in full section, of the ultrasonic frequency wave generator of this invention. Generator 9 comprises two adjacent rectangular blocks, each provided with appropriate passages and channels. Composite block 9 is constructed entirely of a metal that is corrosion-resistant, such as 303 Stainless Steel. A collar, composed of Teflon (polytetrafluorethylene), a thermosetting polymer marketed by the DuPont Company, serves as a seal 41 around adjustable wire 42, which forms the closed end of resonant cavity 43.

The gas stream to be measured enters component body 9a horizontally from conduit 7, via threaded passage 44. The gas stream is flowing under a pressure in the range of 2–10 pounds per square inch guage. The gas stream turns downward into vertical passage 46, then turns again in a horizontal direction into orifice passage 47, which is formed by a groove in the lower face of upper body 9a. The gas stream emerges from orifice 49, flows across resonant cavity 43, and impinges on the opposite edge of cavity 43, whereby the natural energy undulations in the jet stream are greatly amplified in the ultrasonic range. A metal-to-metal seal only is used around the orifice to maintain the orifice smooth and clean. Thus, it may be taken apart and reassembled without altering its dimensions.

The volume of the resonant cavity (RCV) can be made quite small since it results from the drilling of a small hole in lower block 9b. The length of the resonant cavity (RCL), is variable. The RCL is preferably in the range between 0.05 and 0.5 centimeter. As the edge 51 of the resonant cavity acts as the jet edge for this generator, the jet edge distance is constant, being equal to the resonant cavity diameter. A resonant cavity diameter (RCD) of 0.0635 centimeter afforded good frequency stability, combined with the smallest effective resonant cavity volume (RCV) possible. The width of the orifice in this embodiment was held constant at 0.0635 centimeter, but the orifice height may be varied considerably, so that the width-to-height ratio is in the range from 5 to 20. The orifice is preferably rectangular in shape. Based on the foregoing dimensions, the total cell volume will range between about 0.16 and 1.6 microliters, which results in a short time constant for the detection of flow rate change, on the order of a few milliseconds.

More generally, for the small flow rates involved in the present invention, we have found a useful module for sizing the generator dimensions to be 0.00318 centimeter. Using this module, factors of 20, 2 and 20 were found desirable for the orifice width, orifice height, and resonant cavity diameter, respectively.

This type of generator has a flow sensitivity of 24,000 cycles per milliliter per second, equivalent to 400 cycles per milliliter per minute. Assuming that when this device is made to operate at one cycle per second noise level, or better, there is produced a two cycle lower detection limit, or 0.005 milliliter per minute detectible variation in the flow rate.

Figure 3:
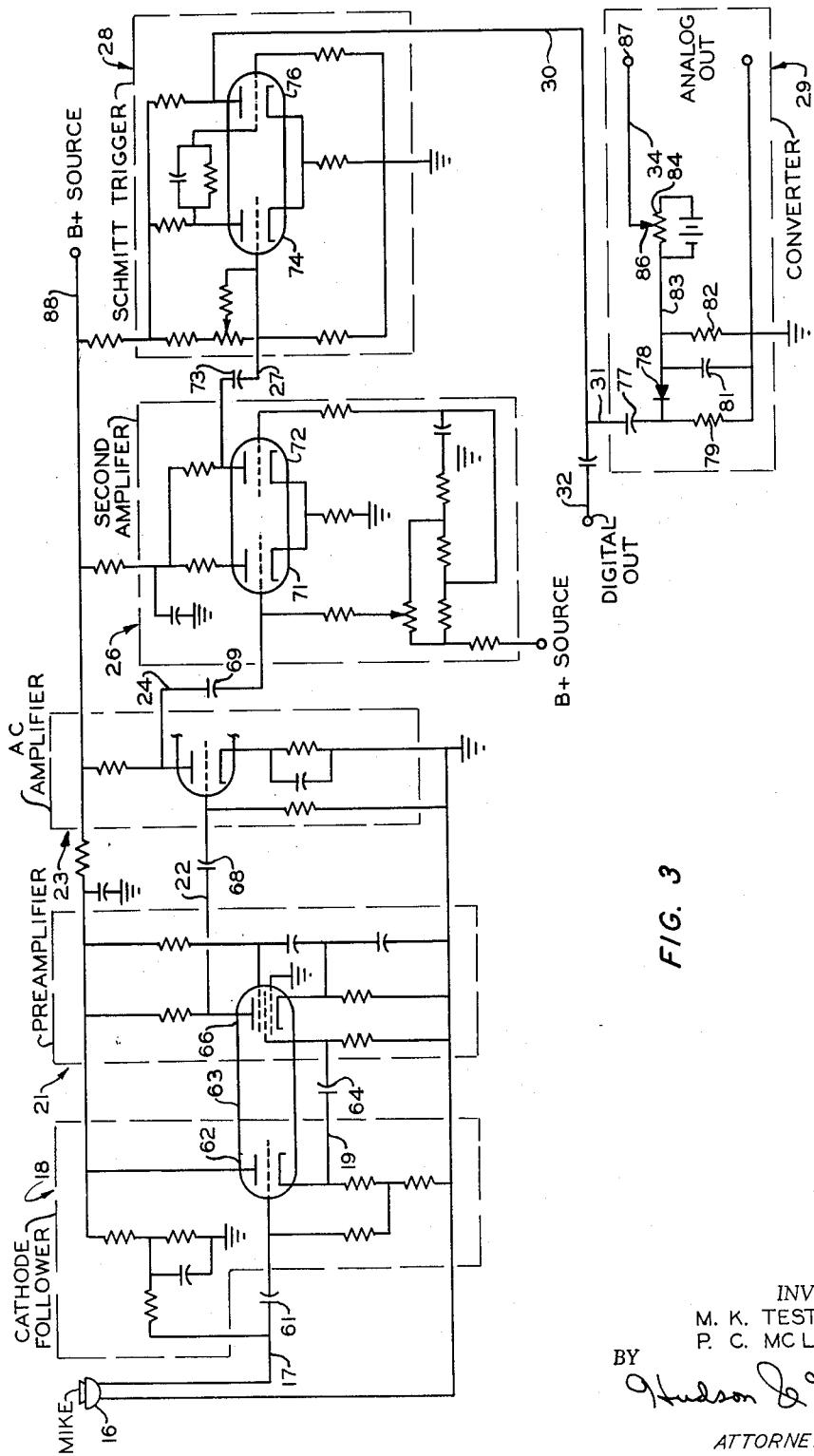
FIGURE 3 is a detail schematic circuitry of the flow rate indicating instrument of this invention.

In FIGURE 3 is shown a detailed schematic of the circuitry of the flow rate indicating instrument of this invention. Lead 17 connects microphone 16, suitably of the capacitor-type, with a capacitor 61 which couples the microphone signal to the control grid of a cathode follower, generally designated 18, which is coupled through lead 19 and capacitor 64 to a preamplifier, generally designated 21. Lead 17 couples through condenser 61 to the triode sections 62 of a triode-pentode 63, such as a 6U8 vacuum tube. Triode section 62 functions as a cathode follower, the output of which is coupled by means of condenser 64 located in lead 19 to the screen grid of the pentode section 66 of tube 63. A signal from the cathode of triode section 62, passes via lead 19, having condenser 64 therein, and is amplified in pentode section 66, which serves as the preamplifier, and produces an amplified signal from the anode thereof, via lead 22, through coupling condenser 68, to a first alternating current amplifier, generally designated 23, such as one section of a 12AX7 vacuum tube.

An amplified signal passes via lead 24, having condenser 69 disposed therein, to the control grid of the first triode section 71 of second amplifier, generally designated 26. Amplifier 26 is a parallel, two-stage amplifier, such as a 12AX7 vacuum tube. A signal from the anode of second section 72 of tube 26 is coupled, via lead 27 and condenser 73, to the control grid of first triode section 74 of a Schmitt Trigger, generally designated 28.

The output from Trigger 28 is suitable for direct use in a digital counter, digital computer, or the like, such as 33 in FIGURE 1, passing thereto via leads 30 and 32. Simultaneously, the same signal may be converted to an analog signal via lead 30 and 31, using a digital-to-analog converter 29.

Converter circuit 29 is triggered by the amplified voltage from the anode of second triode section 76, of trigger 28, connecting via lead 30. The output signal from section 76 is a series of pulses of one polarity, representing the electrical frequency produced in microphone 16.

Converter circuit 29 consists of a coupling condenser 77, and a rectifier 78, such as an IN648, with the junction therebetween connected to ground and to resistor 79. The rectified signal is filtered by a condenser 81, and parallel resistor 82, both of which are connected across the output leads. Lead 83 connects with one terminal of potentiometer 84, the contactor 86 of which connects via lead 34 with the positive analog output terminal 87, such as on recorder 36 of FIGURE 1. This analog output can also connect to a controller, or the like.

For purposes of simplicity, the description of a conventional positive power supply, connected to positive terminal 88, typically 300 volts D.C. has been omitted, as well as the power supplied for the heater elements of the vacuum tubes, all of which are well understood to those skilled in the art.

*Example*

Several runs demonstrated that the relationship between the generator output frequency and volumetric flow rate was linear for every gas tested, as shown in FIGURE 4. Also, the same linear relationship was observed between output frequency and mass flow rate for a fluid of constant composition, as shown in FIGURE 5. It will be noted that each gas of different molecular weight has its own distinct curve.

The volumetric flow rate over which the generator will generate a detectable signal appears to be a function of the molecular weight of the gas. Looking again at FIGURE 4, it will be noted that nitrogen, air and compressed air, whose molecular weights range from 28 to 40, share the same general detectable range of frequencies. The detectable flow rate range with lighter methane covered a slightly higher range of frequency values, while the detectable flow ranges for very light helium and hydrogen were in a much higher frequency range. Thus, the initial point of detectable energy generation varies with the different gases. However, extrapolation of the curves of FIGURE 4 back to a common point shows compatible results for most of the gases tested, with tolerable deviations for the two lightest gases. Overall, the generator performed quite well as a volumetric flow rate meter, and also as a mass flow rate meter for gases of constant composition.

Various modifications and alterations of this invention will become apparent to those skilled in the art without departing from the scope and spirit of this invention and it should be understood that the latter is not necessarily limited to the aforementioned discussion.

We claim:

1. An ultrasonic frequency wave generator serving as a fluid flow rate measuring device comprising an orifice having rectangular cross-sectional area with a width to height ratio greater than one so as to permit a stream of fluid of variable mass flow to jet therefrom, a resonant cavity adjacent said orifice and also disposed below the flowing gas stream; said flowing fluid stream impinging upon the edge of said resonant cavity opposite said orifice, whereby the natural energy undulations in said stream are amplified in the ultrasonic frequency range.

2. The apparatus of claim 1 wherein the width to height ratio of said orifice ranges between 5 and 20.

3. The apparatus of claim 1, further comprising means for varying the resonant cavity length between 0.05 and 0.5 centimeter.

4. The apparatus of claim 1, further comprising means for varying the resonant cavity volume between about 0.16 and 1.6 microliters.

5. A fluid flow rate indicating instrument comprising: an ultrasonic frequency wave generator further comprising an orifice having rectangular cross-sectional area with a width to height ratio greater than one so as to permit a stream of gas of variable flow to jet therefrom; a resonant cavity adjacent said orifice and also disposed below and perpendicular to the flowing gas stream; said flowing gas stream impinging upon the edge of said resonant cavity opposite said orifice; said generator providing an ultrasonic frequency output directly proportional to the flow rate of the gas flowing through said orifice; electrical means to convert the resulting ultrasonic frequency output to a corresponding pulsating electrical signal; means to amplify said signal; and means responsive to the amplified signal for quantitatively measuring the same as representative of the flow rate of said flowing gas through said instrument.

6. A fluid flow rate indicating instrument comprising: an ultrasonic frequency wave generator further comprising an orifice having rectangular cross-sectional area with a width to height ratio greater than one so as to permit a stream of gas of variable mass flow to jet therefrom; a resonant cavity adjacent said orifice and also disposed below and perpendicular to the flowing gas stream; said flowing gas stream impinging upon the edge of said resonant cavity opposite said orifice; said generator providing an ultrasonic frequency output directly proportional to the mass flow rate of the constant composition gas flowing through said orifice; electrical means to convert the resulting ultrasonic frequency output to a corresponding pulsating electrical signal; means to amplify said signal; and means responsive to the amplified signal for quantitatively measuring the same as representative of the mass flow rate of said flowing gas through said instrument.

7. The apparatus of claim 6 wherein the width to height ratio of said orifice ranges between 5 and 20.

8. A method for determining the rate of flow of a gas which comprises the steps of:

maintaining a zone of said gas wherein said gas is relatively stationary;

directing a stream of said gas in a generally rectangular, linear jet having a width to height ratio greater than 1 across one end of said zone in open communication therewith, said jet being positioned with respect to said zone such that the width of said jet substantially covers said end of said zone, the boundary of said end of said zone being defined by an edge in a plane containing the side of said jet adjacent said end, to produce ultrasonic pressure fluctuations in said zone which are a function of the rate of flow of said gas in said jet; and measuring the frequency of said pressure fluctuations in said zone.

9. Flow measuring means comprising:

flow directing means comprising a jet forming conduit having a generally rectangular, linear flow passageway with a width to height ratio greater than 1;

means comprising a cavity for maintaining a relatively stationary quantity of said gas;

said conduit and said cavity being positioned with respect to each other and sized to direct said jet across an open end of said cavity in open communication therewith, the width of said jet substantially covering said cavity, said open end of said cavity being defined by an edge in a plane containing the boundary of said passageway adjacent said end; and means to determine the frequency of pressure fluctuations in said cavity.

10. The apparatus of claim 9 wherein said ratio is in the range of 5 to 20.

11. The apparatus of claim 9 wherein said ratio is in the range of 5 to 20, the cavity has a length between 0.05 and 0.5 centimeter and a volume between 0.16 and 1.6 microliters, and said cavity is substantially at right angles to the passageway.

References Cited in the file of this patent
UNITED STATES PATENTS

| | | |
|---|---|---|
| 2,283,750 | Mikelson | May 19, 1942 |
| 2,458,164 | Hill et al. | Jan. 4, 1949 |
| 2,582,232 | Cesaro et al. | Jan. 15, 1952 |
| 2,788,656 | Sander | Apr. 16, 1957 |
| 2,794,341 | Vonnegut | June 4, 1957 |